United States Patent
Matsuoka et al.

(10) Patent No.: US 7,467,294 B2
(45) Date of Patent: Dec. 16, 2008

(54) MICROCOMPUTER WITH MODE DECODER OPERABLE UPON RECEIPT OF EITHER POWER-ON OR EXTERNAL RESET SIGNAL

(75) Inventors: Toshihiko Matsuoka, Nukata-gun (JP); Naoki Ito, Nukata-gun (JP); Hideaki Ishihara, Okazaki (JP); Yasuyuki Ishikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 11/270,447

(22) Filed: Nov. 10, 2005

(65) Prior Publication Data

US 2006/0107082 A1    May 18, 2006

(30) Foreign Application Priority Data

Nov. 15, 2004  (JP)  ............................. 2004-330378
Jul. 26, 2005   (JP)  ............................. 2005-215968

(51) Int. Cl.
*G06F 9/00* (2006.01)
(52) U.S. Cl. ............................. 713/1; 713/300; 713/323
(58) Field of Classification Search ................. 713/300, 713/320, 323, 1
See application file for complete search history.

(56) References Cited

U.S. PATENT DOCUMENTS 5,617,040 A * 4/1997 Matthews ..................... 326/38
6,138,181 A * 10/2000 Aida et al. ..................... 710/11

FOREIGN PATENT DOCUMENTS

JP    A-2001-167042    6/2001
JP    A-2001-273274    10/2001

* cited by examiner

*Primary Examiner*—Chun Cao
(74) *Attorney, Agent, or Firm*—Posz Law Group, PLC

(57) ABSTRACT

A microcomputer includes a plurality of operation mode selecting terminals to which data for selecting plural operation modes are set. The plurality of operation mode selecting terminals is designed so as to be usable as general-purpose input terminals or output terminals. A decoder decodes the data set to the plurality of operation mode selecting terminals and outputting a mode signal for switching an internal function in accordance with a selected operation mode. A timing signal output unit outputs to the decoder a timing signal for making the decoder execute a decode operation. The timing signal output unit outputs the timing signal when at least one of power-on-reset and an externally controlled reset is varied from an active state to an inactive state.

5 Claims, 8 Drawing Sheets

MICROCOMPUTER WITH MODE DECODER OPERABLE UPON RECEIPT OF EITHER POWER-ON OR EXTERNAL RESET SIGNAL

CROSS REFERENCE TO RELATED APPLICATIONS

This application is based upon, claims the benefit of priority of, and incorporates by reference the contents of, Japanese Patent Application No. 2004-330378 filed on Nov. 15, 2004 and Japanese Patent Application No. 2005-215968 filed on Jul. 26, 2005.

TECHNICAL FIELD

The technical field relates to a microcomputer having a plurality of operation mode selecting terminals for selecting a plurality of operation modes and that are designed to be usable as general-purpose input terminals or output terminals.

BACKGROUND

A microcomputer 1 having a construction as shown in FIG. 8 is known for switching the operation mode of a microcomputer between a normal operation mode and each of various kinds of test modes for testing the functions of respective parts. The microcomputer 1 includes a plurality of operation mode selecting terminals 2, and an internal mode decoder 3 for decoding the level setting states of the terminals to set the operation mode. However, during normal microcomputer 1 operation, the number of unusable terminals is increased; thereby needlessly increasing the chip size of the microcomputer.

Therefore, under such a situation, a microcomputer 4 having a construction as shown in FIG. 9 is provided. According to the construction of the microcomputer 4, a mode decoder 6 executes a decoding operation when the microcomputer 4 is released from a reset state based upon an external signal received at the reset terminal 5 of the microcomputer 4 to determine an operation mode. The selection terminal 2 is then set to be usable as an input terminal or output terminal.

In certain applications in which the microcomputer is mounted on a printed board, it is sufficient to make only power on reset effective. In this case, the signal level of a reset terminal 5 is fixed to a high or low level so that the reset terminal 5 is inactive. Accordingly, when the microcomputer 4 shown in FIG. 9 is applied to such an application as described above, the operation mode of the microcomputer 4 cannot be altered. For example, if the reset terminal 5 is pulled up or pulled down, the potential of the reset terminal can be varied by a switch or the like. However, in this case, there is a disadvantage that the resistance amount to noises is lowered. Therefore, when electrostatic discharge or the like occurs, it is difficult to reset the microcomputer.

Furthermore, for example, JP-A-2001-273274 discloses a construction in which the signal level of a reset terminal is monitored when the power-on-reset in the microcomputer is released, and the normal mode and the test mode are switched in accordance with the level thereof (high or low).

Even in the technique disclosed by the above publication, in order to switch the operation mode when the microcomputer is mounted on the printed board, it is required that power-on-reset be temporarily active. Therefore, during operation of the microcomputer in a test mode, it is impossible to switch the present test mode to the next test mode while the power is on. Accordingly, the microcomputer is required to be turned on again every time the test pattern is switched when a plurality of test patterns are continuously executed. That is, this technique is inconvenient because it requires more time to carry out the test.

SUMMARY

In view of the foregoing, it is an object to provide a microcomputer in which operation mode selecting terminals are allowed to be used as general-purpose input/output terminals and in which the switching operation of the operation mode is more flexible.

According to a microcomputer of a first aspect, a timing signal output unit outputs a timing signal to a decoder for decoding data set in the operation mode selecting terminals to make the decoder execute the decode operation when at least one of power-on-reset and reset controlled by the external is varied from an active state to an inactive state. Accordingly, if the microcomputer is set to a state before being mounted on a printed board, by making a reset signal active and carrying out reset control, the operation modes can be successively switched while power is turned on. Even when the microcomputer is mounted on the printed board and the reset terminal is fixed to an inactive level, the operation mode can be switched by variation of power-on-reset.

According to a microcomputer of a second aspect, the decoder executes the decode operation when a timing signal is output under the state that an enable signal directly input to the decoder itself is active, and outputs a mode signal corresponding to a normal operation mode when the enable signal is inactive. Accordingly, when a user uses the microcomputer for a normal application and it is unnecessary to change the operation mode, if the operation mode is fixed so that the enable signal is inactive, the operation mode of the microcomputer can be prevented from being carelessly shifted.

According to a third aspect, in a case where an external terminal connected to an internal circuit is supplied with predetermined potential from the external when the internal circuit functions, or a case where the external terminal is supplied with predetermined potential from the internal circuit when the internal circuit functions, the external terminal is connected to an enable signal input terminal of the decoder by internal wiring. In general, internal circuits corresponding to various functions are mounted in the microcomputer. The internal circuits are classified into internal circuits having terminals which are required to be supplied with predetermined potential from the external to make the internal circuits concerned function when the microcomputer is set to an operating state, and other internal circuits which are required to output predetermined potential therefrom when the internal circuits concerned function.

Accordingly, under the normal operation of the microcomputer, the enable signal input terminal of the decoder is set to an inactive state by potential supplied from the external or from the internal circuit to an external terminal connected to an internal circuit. If the microcomputer is in a state before the microcomputer is mounted on a printed board, the operation mode can be changed by setting the potential of the external terminal from the external of the microcomputer and making the enable signal input terminal of the decoder active. Accordingly, it is unnecessary to provide an exclusive external terminal to carry out the enable control of the decoder, and the package size can be prevented from being increased.

According to a microcomputer of a fourth aspect, the internal circuit is an AD converter or DA converter, and the external terminal is a reference terminal to be supplied with reference voltage from the external. That is, when the AD converter or the DA converter is operated, it is necessary to externally supply the reference potential for setting a potential for carrying out a comparison operation in the AD converter or DA converter. Accordingly, if the microcomputer is in a state before the microcomputer is mounted on the printed board, the potential of the reference terminal is set to the potential with which the enable signal is active. Under the normal operation of the microcomputer, the enable signal can be made inactive by the reference voltage supplied from the external.

According to a microcomputer of a fifth aspect, the internal circuit is set as a power source control circuit for controlling power source current supplied from an external circuit to internally stabilize the power source voltage supplied from the external circuit, and the external terminal is set as a current control terminal connected to the external circuit and also to which predetermined potential is supplied by the external circuit.

That is, there is known a microcomputer equipped with an external power supply circuit and also with a power control circuit for internally stabilizing the power source voltage by controlling the current supplied from the power supply circuit. In this case, the power control circuit is connected to the external power supply circuit through a current control terminal. Accordingly, during normal operation of the microcomputer, the enable signal input terminal of the decoder is set to an inactive state by the potential supplied from the external power supply circuit to the power current terminal. Furthermore, if the microcomputer is in a state before the microcomputer is mounted on a printed board, the operation mode can be altered by setting the potential of the current control terminal by the external of the microcomputer to set the enable signal input terminal to the inactive state.

According to a microcomputer of a sixth aspect, the internal circuit is set as a voltage dropping power control circuit for internally dropping and stabilizing a power source voltage supplied from the internal, and the external terminal is set as a voltage-dropped power output terminal for supplying the dropped power source voltage to the external. For example, when an internal or external logic circuit or the like operates with a lower voltage, some microcomputers generate dropped power therein and supply the dropped power to the circuit concerned.

In this case, during normal operation of the microcomputer, the voltage dropping power control circuit is also operated to output dropped power. Therefore, the enable signal input terminal of the decoder can be set to the inactive state by the voltage concerned. Furthermore, when the microcomputer is in a state before it is mounted on a printed board, the potential of the voltage-dropped power output terminal is set by the external of the microcomputer to set the enable signal input terminal to the active state, whereby the operation mode can be changed.

BRIEF DESCRIPTION OF THE DRAWINGS

The above and other objects, features and advantages will become more apparent from the following detailed description made with reference to the accompanying drawings.

DETAILED DESCRIPTION

Preferred embodiments will be described hereunder with reference to the accompanying drawings.

First Embodiment

Figure 1:
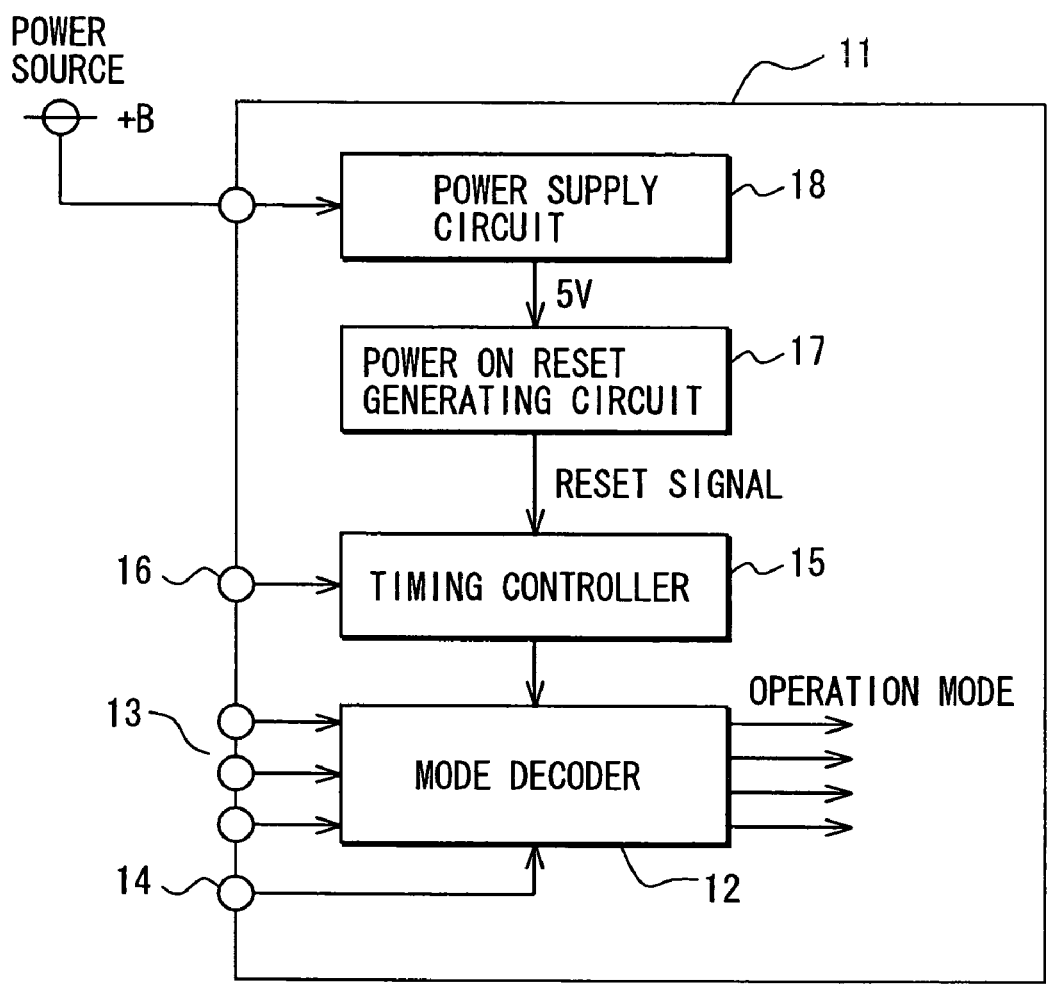
FIG. 1 is a functional block diagram of a portion of a microcomputer according to a first embodiment.

A first embodiment will be described with reference to FIGS. 1 to 4. FIG. 1 is a functional block diagram showing only a portion of the construction of a microcomputer 11. A mode decoder 12 decodes respective data levels externally set by a plurality (for example, "3") operation mode selecting terminals 13 to output an operation mode signal of the microcomputer 11. A mode transition enable terminal 14 is a terminal for supplying an enable signal from the external for allowing the mode decoder 12 to carry out a decode operation.

A mode determining timing controller (timing signal output unit) 15 outputs a timing signal for making the mode decoder 12 execute the decode operation, and supplied as input signals with a reset signal (release signal) supplied from the external through a reset terminal 16, a power-on-reset signal (release signal) output from a power-on-reset generating circuit 17, etc. The power-on-reset generating circuit 17 receives 5V power generated on the basis of 12V power source +B supplied from the external by the power supply circuit 18 to output a power-on-reset signal.

Figure 2:
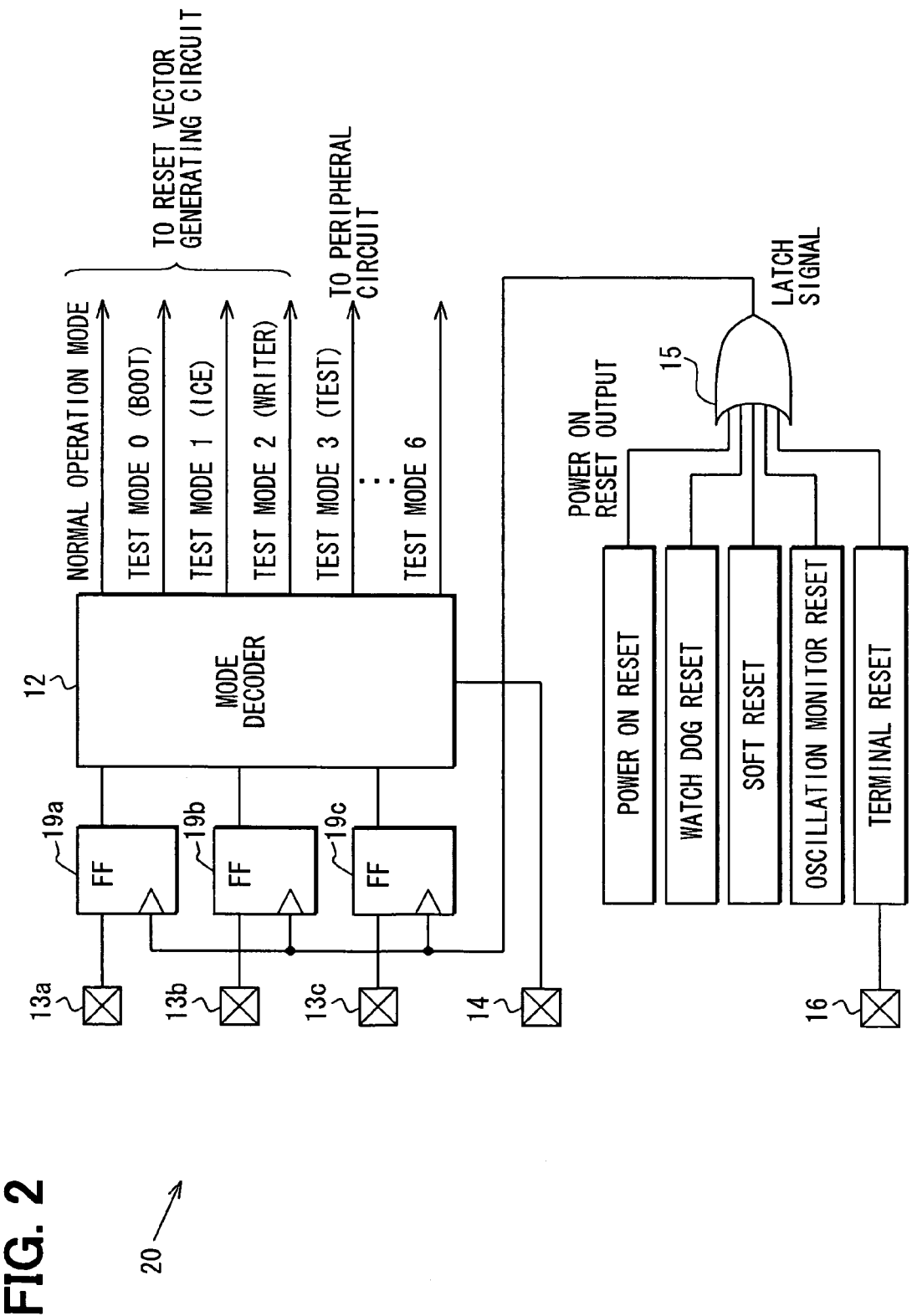
FIG. 2 is a diagram of a mode decoder and a timing controller.

FIG. 2 shows a detailed construction containing mainly the mode decoder 12 and the timing controller 15. Three flip flops 19(a to c) corresponding to three operation mode selecting terminals 13(a to c) are arranged at the input side of the mode decoder 12, and a trigger signal (latch signal) with which these flip flops 19 take in the levels of the operation mode selecting terminals 13 is supplied from the timing controller 15 as described above.

The mode decoder 12 decodes three-bit data supplied through the operation mode selecting terminals to output a normal operation mode [input data:000] and a test mode signal (0 to 6) [input data: 001 to 111]. Furthermore, the mode decoder 12 is designed to carry out the decode operation when the level of the enable terminal 14 is set to an active (high) level, and also to set the normal operation mode to an active (high) state unconditionally when the level of the enable terminal 14 is set to an inactive state.

The timing controller 15 comprises an OR gate to which a release signal caused by various reset factors is input as an input signal. The reset factors contain power-on-reset, watch dog (timer overflow) reset, software reset, clock oscillation monitoring reset, terminal reset based on the reset terminal 16, etc. These signals are set so as to output one-shot pulse at the reset release time from the low level state. Accordingly, when any reset factor is released, the flip flops 19 latch the respective levels of the operation mode selecting terminals 13 at the rising edge of the one-shot pulse output through the timing controller 15, and output the respective levels concerned to the mode decoder 12.

Furthermore, the operation mode selecting terminal 13 is switched to be used as a general-purpose input terminal or output terminal after the operation mode is determined by the mode decoder 12. This switching operation is carried out by using a proper well-known technique or the like. For example, the switching operation may be carried out by writing and setting a control resistor with software (for example, see JP-A-2001-167042, the contents of which are incorporated herein by reference), or by counting a lapse time from the start of the microcomputer 11 with hardware and automatically switching the function after the time point when the operation mode is determined.

"Boot (mode 0)", "ICT (mode 1)", "writer (mode 2)", "test (mode 3)", etc. may be provided as the test modes of the microcomputer 11.

(1) Boot

This is a mode in which when the reset of the microcomputer 11 is released and started, a command is fetched not from ROM having a user program stored therein, but from boot ROM which is prepared in advance. In the boot ROM is arranged a program for transmitting a program received by communicating with external equipment through a communication port of the microcomputer 11 and execute the program concerned, etc. Accordingly, programs other than the program stored in user ROM can be executed. For example, they can be used to test and estimate the microcomputer 11.

(2) ICE (In Circuit Emulator)

For example, this is a mode in which information is received or scanned through an internal bus of the microcomputer 11 in order to read out the content of RAM or a register of a peripheral circuit or a command executed by CPU and displaying the content in external equipment, or stop (break) execution of the program when a program counter in CPU counts some value. This mode makes the microcomputer 11 implement ICE operation.

(3) Writer

This is used when flash ROM is mounted in the microcomputer 11, and it is a mode to start a rewriting program of the flash ROM upon starting of the microcomputer 11, communicate with a ROM writer connected to the outside of the microcomputer 11 to receive user program, and rewrite the content of the flash ROM (the user ROM in this case).

(4) Test

This is a mode in which in order to make CPU fetch a command for a test, a general-purpose port of the microcomputer 11 is used as a test bus and a command is supplied from the external (test terminal). Furthermore, the signal state of the microcomputer 11 may be read out.

In order to switch the test mode as described above, the normal operation mode an the test modes 0 to 2 out of the respective mode signals output from the mode decoder 12 are output to a reset vector generating circuit. This is because an address at which CPU fetches a command is different in accordance with each mode. The test mode 3 is output to peripheral circuits of a CPU and a switching circuit for a route along which a command is fetched, and each peripheral circuit is switched so as to operate in the test mode. For example, in the test mode, writing/reading of a communication circuit into/from a reception buffer can be performed.

Figure 3:
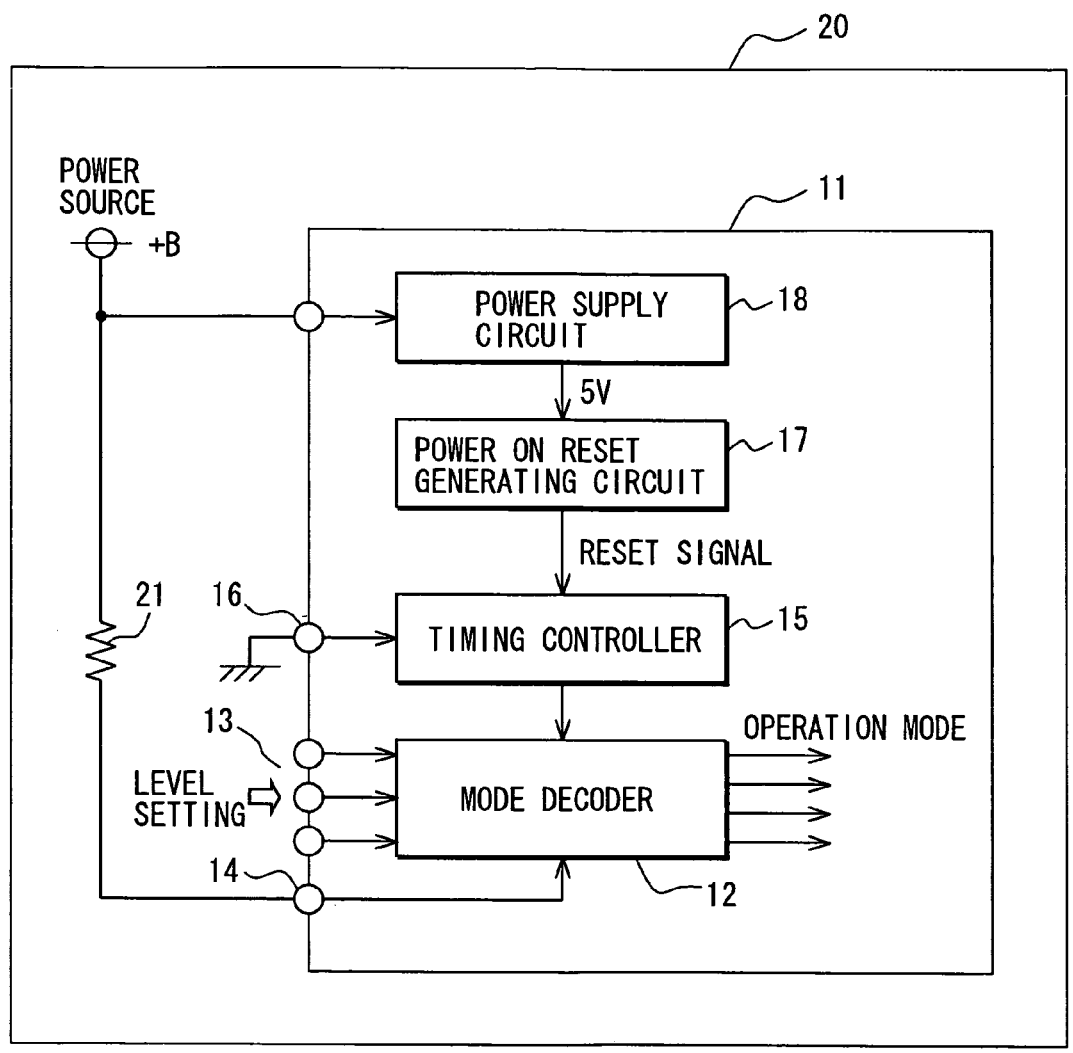
FIG. 3 is a block diagram of the microcomputer when mounted on a printed board.

Next, the operation of this embodiment will be described with reference to FIGS. 3 and 4. FIG. 3 shows a state where the microcomputer 11 is mounted on the printed board 20 to apply the microcomputer 11 to an actual application. The reset terminal 16 is pulled down to the circuit ground, and the enable terminal 14 is connected to the power source +B through a pull-up resistor 21. Furthermore, the operation mode selecting terminals 13(*a* to *c*) are set to high or low level in accordance with an operation mode to be set in the microcomputer 11.

Figure 4:
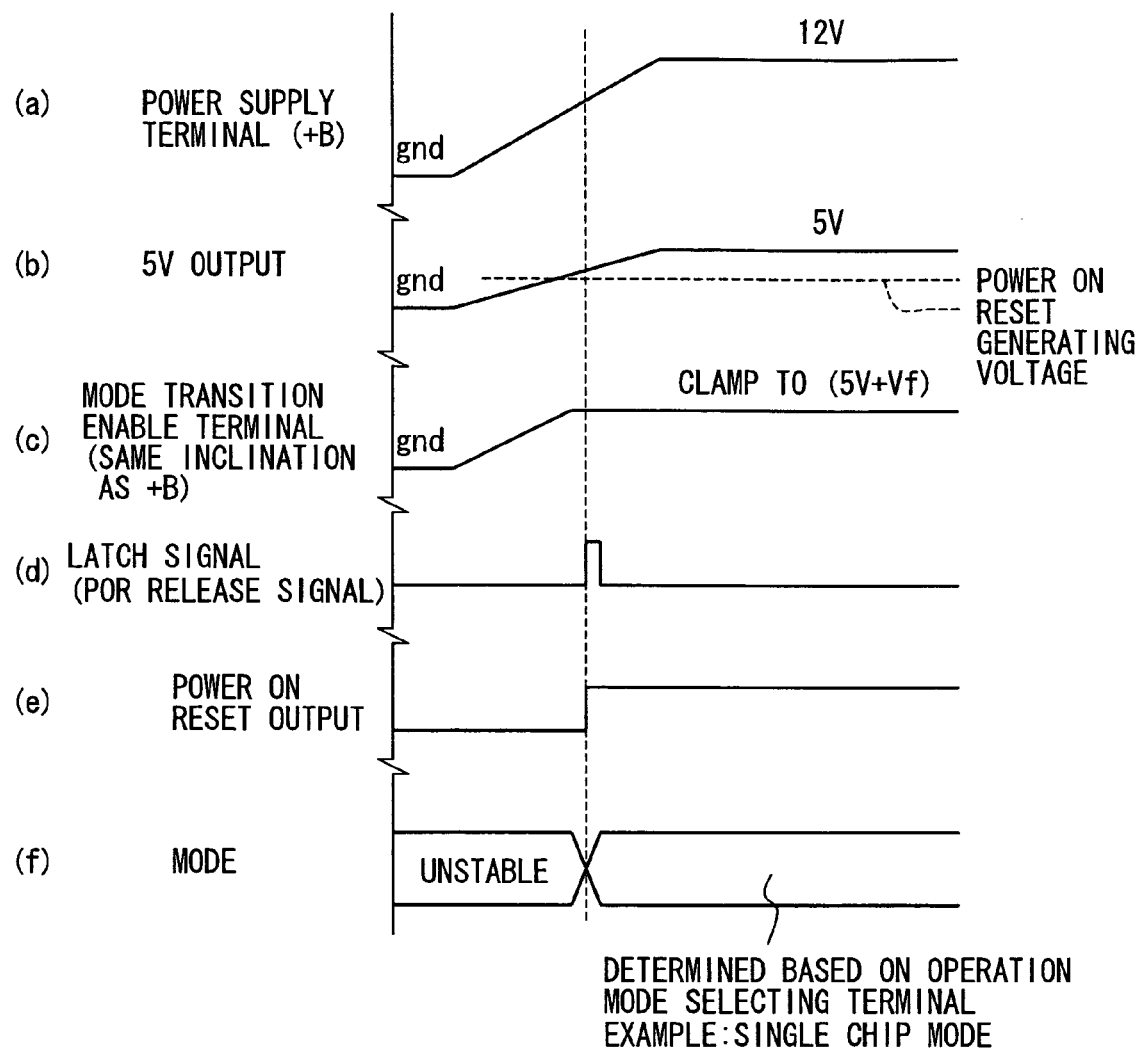
FIG. 4 is a timing diagram of a power-on-reset sequence of the microcomputer.

FIG. 4 is a timing chart showing the state of each signal when the 12V power source +B is supplied to the microcomputer 11 to start the microcomputer 11 (that is, power-on-reset sequence). When the power source +B indicated by (a) is supplied, the power supply circuit 18 boosts the output voltage of the 5V power source (b) in accordance with the boosting degree of the power source voltage. Furthermore, the voltage applied to the enable terminal 14 is also boosted in accordance with the boosting degree of the +B power source voltage (c). The voltage applied to the enable terminal 14 is clamped to (5V+Vf) by an input protecting diode (not shown) connected between the enable terminal 14 and the 5V power source in the microcomputer 11, wherein Vf represents the forward voltage of the diode, and the enable signal of high level is supplied to the mode decoder 12.

In the power-on-reset circuit 17, a power-on-reset (POR) generating voltage is set to about 3V, for example (b), and when the 5V power source voltage exceeds 3V, the power-on-reset circuit 17 outputs a power-on-reset release signal in the form of one shot pulse (d). In this case, the power-on-reset signal is varied from the low state to the high state, that is, from the active (reset) state to the inactive (reset release) state (e). The power-on-reset release signal is output to the flip flop 19 through the timing controller 15 as a latch signal, and at the rise-up time of the latch signal, the mode signal output from the mode decoder 12 is changed from an unstable state before the rise-up of the latch signal to a settled state (f).

As described above, according to this embodiment, when the state of at least one of the power-on-reset and the reset controlled by the external to the timing controller 15 is varied from the active state to the inactive state, the timing controller 15 outputs a timing signal (the latch signal of the flip flop 19) for making the mode decoder 12 execute the decode operation, and the mode decoder 12 executes the decode operation when the timing signal is output under the state that the enable signal supplied from the external through the enable terminal 14 is active.

Accordingly, when the microcomputer 11 is in a state before it is mounted on the printed board 20, by making the enabling signal active and varying the reset signal, the mode operation can be successively switched under the state that the microcomputer 11 is supplied with power. Accordingly, the various test modes can be continuously executed while successively switched to one another, so that the time required to the test can be shortened.

Furthermore, even when the microcomputer 11 is mounted on the printed board 20 and the reset terminal 16 is fixed to an inactive level (low) state, if the enable signal is set to the active state at the time when the power is turned on again, the operation mode can be switched by variation of the power-on-reset signal.

Still furthermore, when the enable signal is inactive, the mode decoder 12 outputs the operation mode signal corresponding to the normal operation mode. Therefore, when the user uses the microcomputer 11 for a normal application and it is unnecessary to change the operation mode, the operation mode of the microcomputer 11 can be prevented from being carelessly shifted by fixing the level of the corresponding enable terminal 14 so that the enable signal is inactive.

Second Embodiment

Figure 5:
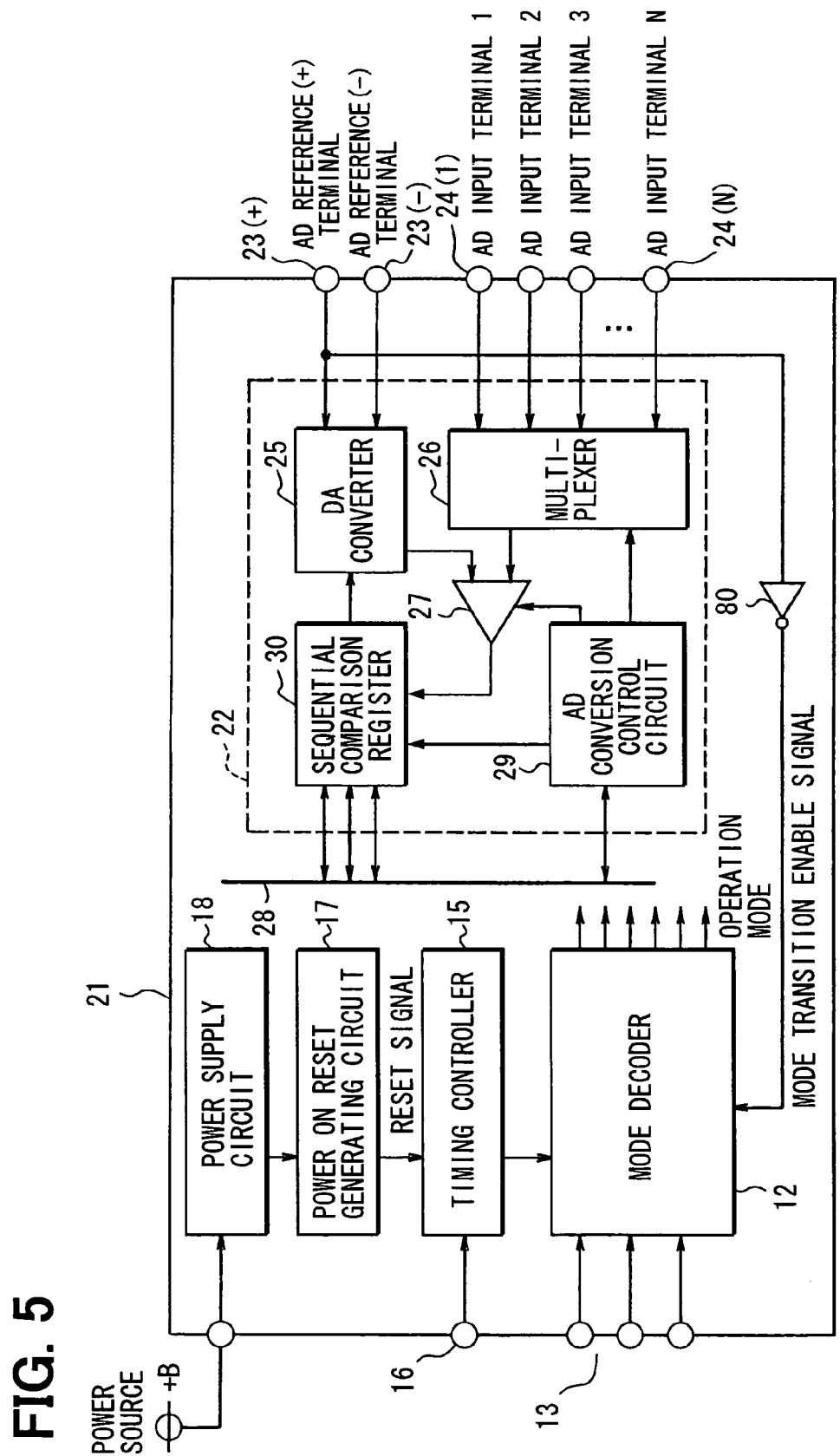
FIG. 5 is a diagram showing a second embodiment corresponding to FIG. 1.

FIG. 5 shows a second embodiment. The same elements as the first embodiment are represented by the same reference numerals, the description thereof is omitted, and only the different portion will be described. For example, a sequential comparison type AD converter (internal circuit) 22 is mounted in a microcomputer 21 of the second embodiment. The AD converter 22 has a well-known construction, and the internal construction and operation thereof will be briefly described.

The microcomputer 21 is provided with AD reference terminal (external terminal) 23(+), terminal 23(−), and a plurality of AD input terminals 24 (1 to N) as external terminals connected to the AD converter 22. The AD reference terminal 23(+) and terminal 23(−) are terminals for supplying reference voltages (+), (−) from the external of the microcomputer 21 to a DA converter 25 in the AD converter 22. When the microcomputer 21 operates at 5V, the reference terminal 23(+) is normally set to 5V by the external, and the reference terminal 23(−) is set to 0V (ground) by the external. Furthermore, the plural AD input terminals 24 are terminals to which analog voltage signals serving as AD conversion targets are input from the external of the microcomputer 21.

The output of each of the AD input terminals 24 is supplied to one of the input terminals of a comparator 27 through a multiplexer 26 in the AD converter 22. An AD conversion control circuit 29 and a sequential comparison register 30 in the AD converter 22 are connected to a data bus 28 in the microcomputer 21. The AD conversion control circuit 29 controls the multiplexer 26, the comparator 27 and the sequential comparison register 30 in accordance with a condition set by core CPU (not shown) of the microcomputer 21 to carry out the AD conversion processing.

The sequential comparison register 30 outputs conversion data to the DA converter 25, and the DA converter 25 converts the conversion data to an analog signal and outputs a comparison reference signal to the other input terminal of the comparator 27. The comparator 27 compares the analog input supplied through the multiplexer 26 with the comparison reference signal, and outputs the comparison result to the sequential comparison register 30. Then, the bit data of the comparison result which is successively stored in the sequential comparison register 30 are output as AD conversion result data to the data bus 28.

When the AD converter 22 thus constructed is mounted in the microcomputer 21, the AD reference terminal 23(+) of the external terminal and the enable signal input terminal of the mode decoder 12 are connected to each other through an inverter gate 80 by an internal wiring of the microcomputer 21. As not shown, it is preferable that a protection buffer is interposed between the input terminal of the inverter gate 80 and the AD reference terminal 23(+). Accordingly, the microcomputer 21 is not provided with the external terminal, that is, the mode transition enable terminal 14 which is provided to the microcomputer 11 of the first embodiment.

Next, the action of the second embodiment will be described.

When the microcomputer 21 is operated while mounted on the printed board as in the case of the first embodiment shown in FIG. 3 (the reset terminal 16 is likewise pulled down), the reference terminal 23(+) is set to 5V by the external as described above. Accordingly, the level of the enable signal input terminal in the mode decoder 12 is low, that is, inactive, and thus the microcomputer 21 is set to the normal operation mode by power-on-reset.

Furthermore, if the microcomputer 21 is in a state before it is mounted on the printed board, the enable signal input terminal in the mode decoder 12 is set to active level by setting the reference terminal 23(+) to 0V from the external, so that the operation mode can be varied by controlling the level of the reset terminal 16 under the state that the power is supplied to the microcomputer 21.

As described above, according to the second embodiment, when the AD converter 22 is mounted in the microcomputer 21, the reference terminal 23(+) for supplying the reference voltage from the external and the enable signal input terminal of the mode decoder 12 are connected to each other through the inverter gate 80 by internal wiring. Accordingly, it is unnecessary that an exclusive enable terminal 14 for carrying out enable control of the mode decoder 12 is provided as an external terminal as in the case of the microcomputer 11 of the first embodiment, and the package size of the microcomputer 21 can be avoided from being enlarged.

Third Embodiment

Figure 6:
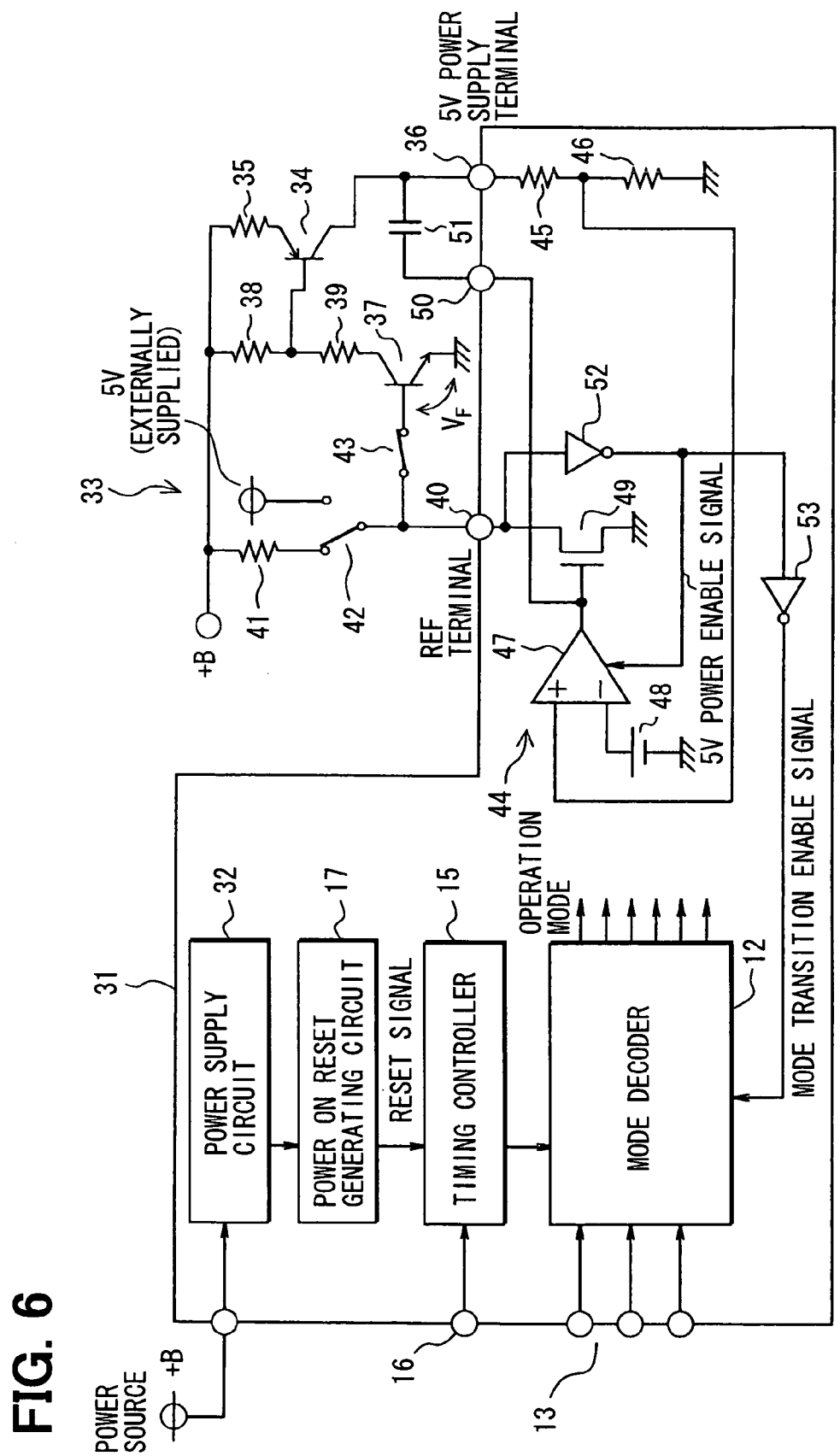
FIG. 6 is a diagram showing a third embodiment corresponding to FIG. 3.

FIG. 6 shows a third embodiment, and only the different portion from the first embodiment will be described.

In a microcomputer 31 according to a third embodiment, a power supply circuit 32 replacing the power supply circuit 18 is designed to generate and output 5V power source only to generate a power-on-reset signal to the power-on-reset generating circuit 17. When the microcomputer 31 is mounted on the printed board as shown in FIG. 3, an external power supply circuit (external circuit) 33 constructed at the substrate side is connected to the microcomputer 31, and the internal circuit of the microcomputer 31 is provided with operating power from the power supply circuit 33.

The power supply circuit 33 is constructed as follows. That is, the emitter of a PNP transistor 34 is connected to the power source +B through a resistor 35, and the collector thereof is connected to the 5V power source terminal 36. The emitter of an NPN transistor (current control transistor) 37 is connected to the ground, and the power source +B and the collector are connected to each other through a series circuit comprising resistors 38 and 39. The common connection point between the resistors 38 and 39 is connected to the base of the transistor 34.

A series circuit comprising a resistor 41 and a switch 42 is connected between the power source +B and the REF terminal (current control terminal) of the microcomputer 31, and the base of the transistor 37 is connected to the REF terminal 40 through a switch 43. The switch 42 is a change-over switch, and it switches the connection of the REF terminal 40 and the resistor 41 side and the connection of the REF terminal 40 and the side of 5V power generated at the substrate side (supplied from the external) to each other.

The 5V power generated by the power supply circuit 33 is supplied to the microcomputer 31 through the 5V power supply terminal 36, and a power control circuit (internal circuit) 44 for stabilizing the 5V power therein is constructed. That is, a series circuit comprising resistors 45 and 46 is connected between the 5V power supply terminal 36 and the ground, and the common connection point therebetween is connected to non-inverting input terminal of a power control amplifier 47. A reference voltage 48 is input to the inverting input terminal of the power control amplifier 47, and the output terminal of the power control amplifier 47 is connected to the gate of N-channel MOSFET 49. The output terminal of the power control amplifier 47 is connected to the collector of the transistor 34 of the power supply circuit 33 through a capacitor connection terminal 50 and a phase compensating capacitor 51 of the microcomputer 41.

The source of FET 49 is connected to the ground, and the drain of FET 49 is connected to the REF terminal 40. The REF terminal 40 is connected to the enable signal input terminal of the mode decoder 12 through inverters 52 and 53. Furthermore, the output terminal of the inverter 52 is connected to the control terminal of the power control amplifier 47, and supplies the power control amplifier 47 with the 5V power enable signal. The power control amplifier 47 is set to operate when the enable signal is set to high level.

Next, the action of the third embodiment will be described. When the microcomputer 31 is normally operated while mounted on the printed board (the reset terminal 16 is pulled down as in the case of FIG. 3), the switches 42 and 43 in the power supply circuit 33 are set so that the switch 42 is switched to the resistor 41 side and the switch 43 is turned on as shown in FIG. 6. In this case, the transistors 37 and 34 are supplied with base current to be set to ON state, and power source current is supplied to the 5V power terminal 36 of the microcomputer 31.

At this time, the level of the REF terminal 40 is in the neighborhood of the base potential of the transistor 37, that is, the base-emitter voltage VF, and the threshold value of the inverter gate 52 is set so that the potential concerned can be surely judged as low level. Accordingly, the output level of the inverter gate 42 is set to high level, and the 5V power enable signal is set to active level, so that the power control amplifier 47 operates. Furthermore, at this time, the output level of the inverter gate 53 becomes low, and thus the enable signal input terminal of the mode decoder 12 becomes inactive, so that the mode data 12 sets only the normal operation mode.

The power control amplifier 47 of the power control circuit 44 compares the divided potential of the resistors 45 and 46 with the reference voltage 48. If the former is larger than the latter, the output level is increased. At this time, FET 49 allows a larger amount current to flow therethrough, and the base current supplied to the transistor 37 in the power supply circuit is reduced. In connection with the reduction of the base current, the base current of the transistor 34 is also reduced, and thus feedback control is carried out so that the potential of the 5V power terminal 36 is reduced.

Furthermore, when the operation mode of the microcomputer 31 is desired to be changed to an operation mode other than the normal operation mode under the state that the microcomputer 31 is mounted on the printed board, the switch 42 is switched to the 5V side and also the switch 43 is turned off. At this time, since the potential of the REF terminal 40 is set to 5V, the output level of the inverter gate 52 becomes low and the 5V power enable signal becomes inactive, so that the power control amplifier 47 stops its operation. Then, the enable signal input terminal of the mode decoder 12 becomes active, so that the mode decoder 12 sets the operation mode in accordance with the setting of the operation mode selecting terminal 13 by power-on-reset. In addition, it is needless to say that if the microcomputer 31 is in a state before it is mounted on the printed board, the REF terminal 40 may be set to the high level by the external of the microcomputer 31.

As descried above, according to the third embodiment, when the power control circuit 44 for controlling the supplied power source current is installed in the microcomputer 31 in order to stabilize the 5V power source voltage supplied from the external power supply circuit 33 in the microcomputer 31, the REF terminal 40 connected to the base of the current controlling transistor 37 contained in the power supply circuit 33 is connected to the enable signal input terminal of the mode decoder 12 through the inverter gates 52 and 53 by internal wiring.

Accordingly, when the microcomputer 31 is mounted on the printed board and operated in the normal operation mode, the enable signal input terminal of the mode decoder 12 is set to the inactive level by the potential supplied from the power supply circuit 33 to the REF terminal 40. When the microcomputer 31 is in a state before it is mounted on the printed board, the operation mode could be changed if the enable signal input terminal is set to the active level by setting the potential of the REF terminal 40 from the external of the microcomputer 31.

Furthermore, according to the third embodiment, when the switches 42 and 43 are provided to the external power supply circuit 33, the operation mode of the microcomputer 31 can be changed in accordance with the setting of the operation mode selecting terminal 13 by power-on-reset even under the state that the microcomputer 31 is mounted on the printed board if the switching of the switches 42 and 43 is changed.

Fourth Embodiment

Figure 7:
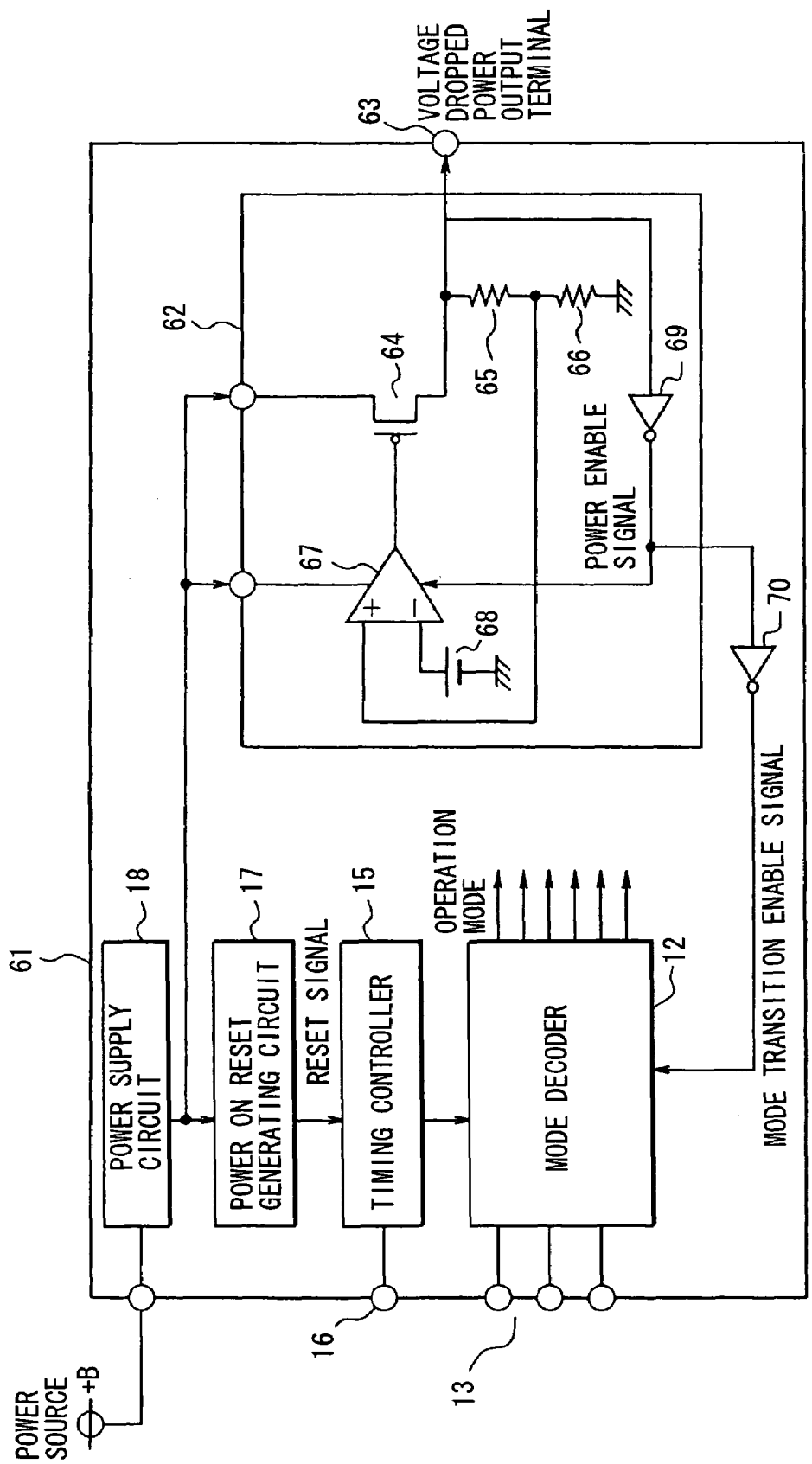
FIG. 7 is a diagram showing a fourth embodiment corresponding to FIG. 1.
Figure 8:
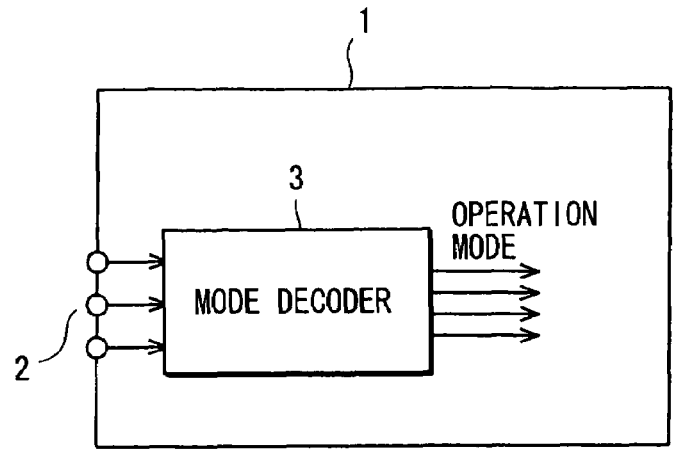
FIG. 8 is a diagram showing a related art which corresponds to FIG. 1.
Figure 9:
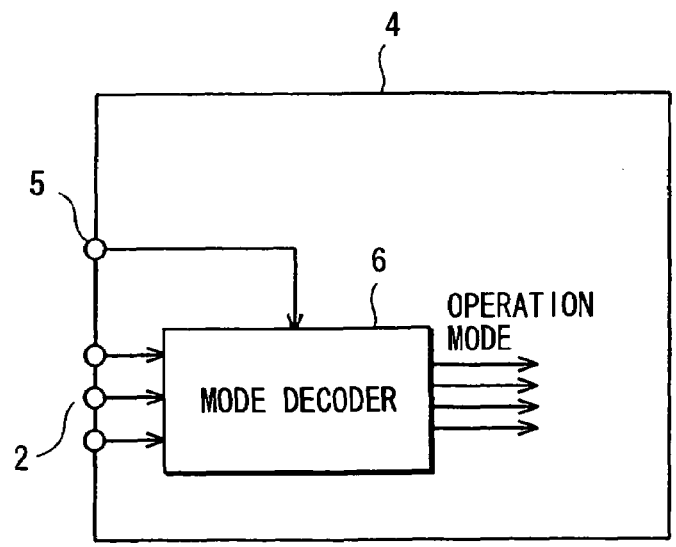
FIG. 9 is a diagram showing a related art which corresponds to FIG. 1.

FIG. 7 shows a fourth embodiment, and only the different portion from the first embodiment will be described. A microcomputer 61 of a fourth embodiment is equipped with a voltage-dropped power control circuit (internal circuit) 62 for dropping the power supplied from the power supply circuit 18 and generating and supplying power of 3.3V, 2.5V, 1.5V, etc., for example. This voltage-dropped power is supplied to a logic circuit in the microcomputer 61, and also supplied to an external circuit of the microcomputer 61 through a voltage-dropped power output terminal (external terminal) 63.

The voltage-dropped power control circuit 62 receives the 5V power through the source of P-channel MOSFET 64, and the drain of FET 64 is connected to the ground through a series circuit of resistors 65 and 66 and also connected to the voltage drop output terminal 63. The common connection point of the resistors 65 and 66 is connected to the non-inverting input terminal of a control amplifier 67, and a reference voltage 68 is connected to the inverting input terminal of the control amplifier 67. The output terminal of the control amplifier 67 is connected to the gate of FET 64.

Furthermore, the drain of FET 64 is connected to the enable signal input terminal of the mode decoder 12 through inverter gates 69 and 70, and the output terminal of the inverter gate 69 is connected to the control amplifier 67 to supple a power enable signal to the control amplifier 67. The control amplifier 67 is designed to operate when the enable signal is set to high level. An input threshold value of the inverter gate 69 is set to a value higher than the normal value so that the voltage-dropped power level can be surely recognized as low level.

Next, the action of the fourth embodiment will be described.

When the microcomputer 61 is mounted on the printed board and normally operates, 5V power is supplied to the voltage-dropped power control circuit 62 and the potential of the voltage-dropped power output terminal 63 is about to increase from the ground level. However, the output of the inverter 69 is kept to high level during that period, so that the control amplifier 67 operates. Furthermore, the potential of the voltage-dropped power output terminal 63 is converged to the voltage-dropped power level.

Thereafter, the inverter 69 continues to output the high level, so that the power enable signal becomes active and the enable signal input terminal of the mode decoder 12 is set to low level. Therefore, the mode transition enable signal is inactive and the mode decoder 12 sets only the normal operation mode by power-on-reset.

The control amplifier 67 of the voltage-dropped power control circuit 62 compares the divided potential of the resistors 65 and 66 with the reference voltage 68, and increases the output level if the former is larger than the latter. At this time, FET 64 reduces the current and thus the potential of the voltage-dropped power output terminal 63 is subjected to feedback control so that it is reduced.

Furthermore, when the operation mode of the microcomputer 61 is desired to be changed before the microcomputer 61 is mounted on the printed board, the potential of the voltage-dropped power output terminal 63 is set to 5V, for example. At this time, the power enable signal becomes inactive and thus the control amplifier 67 stops its operation. Furthermore, the mode transition enable signal becomes active, and thus the mode decoder 12 sets the operation mode in accordance with the setting of the operation mode selecting terminal 13 by power-on-reset.

As described above, according to the fourth embodiment, the microcomputer 61 is equipped with the voltage-dropped power control circuit 62 for generating and supplying power achieved by dropping the power supplied from the power supply circuit 18, and the voltage-dropped power output terminal 63 is connected to the enable signal input terminal of the mode decoder 12 through the inverter gates 69 and 70 by internal wiring. Accordingly, under the normal operation of the microcomputer 61, the voltage-dropped power control circuit 62 also operates and thus the voltage-dropped power is output, so that the enable signal input terminal of the mode decoder 12 can be set to the inactive level by the dropped voltage. Furthermore, if the microcomputer 61 is in a state before it is mounted on the printed board, the operation mode of the mode decoder 12 can be changed in accordance with the setting of the operation mode selecting terminal 13 by setting the potential of the voltage-dropped power output terminal 63 to high level by the external of the microcomputer 61.

The present invention is not limited to only the embodiments described above with reference to the drawings, and the following modifications may be made to the above embodiments.

The number of the operation mode selecting terminals may be equal to "2", or "4" or more.

The timing signal output unit may be designed so as to output the timing signal to the decoder when at least one of power-on-reset and the reset instructed from the external transits from the active level (state) to the inactive state level (state).

The active level of the signal may be properly changed in accordance with an individual design.

The function for controlling the decode operation of the mode decoder 12 by the enable terminal 14 may be provided as occasion demands.

For example, as shown in the first embodiment of FIG. 3, when the microcomputer 11 is mounted on the printed board 20 and is operated in only the normal operation mode, the enable terminal 14 may be set to the inactive state, and also the operation mode selecting terminal 13 may be set to the normal operation mode [input data: 000]. In this case, the setting of the normal operation mode is duplexed as described above, and thus even when any one of the operation mode selecting terminal 13 and the enable terminal 14 is set to an open state, the microcomputer 11 can be prevented from shifting to the other operation modes. For example, when the microcomputer 11 is used as ECU (Electronic Control Unit) for controlling a vehicle under a harsh environment, this embodiment is effective as a fail safe countermeasure.

In the second embodiment, the positive-phase signal of the reference terminal 23(−) may be connected to the enable signal input terminal of the mode decoder 12 in place of the reference terminal 23(+).

Furthermore, in the second embodiment, when the logic of the enable signal in the mode decoder 12 is inverse, the inverter gate 30 is unnecessary.

Still furthermore, in the second embodiment, when a DA converter is mounted in the microcomputer in place of the AD converter 22, the reference terminal of the DA converter may be likewise connected to the enable signal input terminal of the mode decoder 12.

In the third embodiment, when it is unnecessary to set the operation mode of the microcomputer 31 to operation modes other than the normal operation mode under the state that the microcomputer 31 is mounted on the printed board, the switches 42 and 43 in the power supply circuit 33 are unnecessary, and the base of the transistor 37 may be directly connected to the resistor 41.

The internal circuits mounted in the microcomputer are not limited to the second to fourth embodiments, and any internal circuit may be used insofar as the internal circuit is connected to at least one external terminal and the external terminal concerned serves as a terminal that is supplied with predetermined potential when the internal circuit concerned functions or serves as a terminal that is supplied with predetermined potential from the internal circuit concerned when the internal circuit concerned has functioned.

What is claimed is:

1. A microcomputer comprising:

a plurality of operation mode selecting terminals to which data for selecting plural operation modes are set, wherein the plurality of operation mode selecting terminals are designed so as to be usable as general-purpose input terminals or output terminals;

a decoder for decoding the data set to the plurality of operation mode selecting terminals and outputting a mode signal for switching an internal function in accordance with a selected operation mode; and a timing signal output unit for outputting to the decoder a timing signal for making the decoder execute a decode operation, wherein the timing signal output unit outputs the timing signal when at least one of power-on-reset and an externally controlled reset is varied from an active state to an inactive state, wherein the decoder executes the decode operation when the timing signal is output under the state that an enable signal directly supplied to the decoder itself is active, and also outputs a mode signal corresponding to a normal operation mode when the enable signal is inactive.

2. The microcomputer according to claim 1, further comprising an internal circuit connected to at least one external terminal, wherein the external terminal serves as a terminal that is supplied with predetermined potential from the external when the internal circuit functions, or serves as a terminal that is supplied with predetermined potential from the internal circuit when the internal circuit has functioned, wherein the external terminal is connected to an enable signal input terminal of the decoder by internal wiring.

3. The microcomputer according to claim 2, wherein the internal circuit is an AD convener or DA converter, and the external terminal is a reference terminal for supplying a reference voltage from the external.

4. The microcomputer according to claim 2, wherein the internal circuit is a power control circuit for controlling power source current supplied from an external circuit to stabilize the power source voltage supplied, and the external terminal is a current controlling terminal that is connected to the external circuit and supplied with predetermined potential from the external circuit.

5. The microcomputer according to claim 2, wherein the internal circuit is a voltage drop power control circuit for dropping and stabilizing an internally supplied power source voltage, and the external terminal is a voltage-dropped power output terminal for externally supplying the voltage-dropped power source voltage.

* * * * *